(12) United States Patent
Taniguchi et al.

(10) Patent No.: US 7,557,878 B2
(45) Date of Patent: Jul. 7, 2009

(54) LIQUID CRYSTAL DISPLAY PANEL

(75) Inventors: Hironori Taniguchi, Tottori (JP); Shinichiro Tanaka, Tottori (JP); Hideki Kaneko, Tottori (JP); Tae Nakahara, Tottori (JP); Masashi Ariga, Tottori (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 168 days.

(21) Appl. No.: 11/808,816

(22) Filed: Jun. 13, 2007

(65) Prior Publication Data

US 2008/0123032 A1    May 29, 2008

(30) Foreign Application Priority Data

Jun. 15, 2006   (JP) ............................. 2006-166011

(51) Int. Cl.
  *G02F 1/1335* (2006.01)
(52) U.S. Cl. ..................... 349/113; 349/122; 349/138; 349/153; 349/190
(58) Field of Classification Search ................. 349/113, 349/122, 138, 153, 190
See application file for complete search history.

(56) References Cited

U.S. PATENT DOCUMENTS

| | | | |
|---|---|---|---|
| 6,501,528 B1 * | 12/2002 | Hamada | 349/158 |
| 6,765,637 B2 * | 7/2004 | Takenaka | 349/113 |
| 2002/0054261 A1 * | 5/2002 | Sekiguchi | 349/122 |
| 2003/0231276 A1 * | 12/2003 | Miki et al. | 349/149 |
| 2007/0070272 A1 * | 3/2007 | Gettemy et al. | 349/114 |
| 2007/0291203 A1 * | 12/2007 | Nakahara et al. | 349/113 |

FOREIGN PATENT DOCUMENTS

JP    2003-228049 A    8/2003

* cited by examiner

*Primary Examiner*—Ellen Kim
(74) *Attorney, Agent, or Firm*—Westerman, Hattori, Daniels & Adrian, LLP.

(57) ABSTRACT

A liquid crystal display panel 10 of the invention has: an array substrate with a display region 14 in which a pixel electrode is formed in each of the regions enclosed by a plurality of signal lines and scan lines deployed as matrices; a opposed substrate with a common electrode; and a liquid crystal layer that is sealed between the array substrate and the opposed substrate by means of sealing agent 35 that seals together the peripheries of the two substrates. Features are: the periphery of the array substrate's display region 14 is covered by a border region 34 that has a reflector 37a and a continuous transparent electrode 38a, the outer periphery of the border region 34 is sealed by the sealing agent 35, and the border region 34's transparent electrode 38a is electrically coupled to the common electrode. Thanks to such structure, the border region improves the appearance at the periphery of the display region, and the phenomenon of night vision alongside the scan line wiring does not occur.

7 Claims, 13 Drawing Sheets

LIQUID CRYSTAL DISPLAY PANEL

BACKGROUND

1. Technical Field

The present invention relates to a liquid crystal display panel. More particularly the present invention relates to a liquid crystal display panel having an ornamental reflective part (border region) for improving the appearance around the periphery of the display region, wherein dark lines do not appear alongside the scan line wiring in the border region.

2. Related Art

Over recent years the application of liquid crystal display panels has spread rapidly, not only in information and telecommunications equipment but in electrical equipment in general. Since liquid crystal display panels do not themselves emit light, the transmissive type of liquid crystal display panel that is equipped with a backlight is much employed.

However, since backlights consume large amounts of power, the reflective type of liquid crystal display panel which does not need a backlight have been used, especially for portable equipment, in order to reduce power consumption. But reflective liquid crystal display panels use external light as light source and therefore are difficult to view in dark interiors of rooms, etc. Accordingly, in recent times particular progress has been made with the development of liquid crystal display panels of a semi-transmissive type, which possess the capabilities of both the transmissive and reflective types.

Having, in each pixel region, a transmissive part equipped with a pixel electrode and a reflective part equipped with both a pixel electrode and a reflection electrode, in dark places semi-transmissive liquid crystal display panels display images by lighting a backlight and utilizing the transmissive part of the pixel region, and in bright places by utilizing external light via the reflective part, without lighting the backlight. Thus, such panels have the advantages of not needing to light the backlight always, and of being able to drastically reduce power consumption.

A specific example of a related-art semi-transmissive liquid crystal display panel is described below using FIGS. 7 to 9. FIG. 7 is a schematic plan view of a related-art single-terminal type semi-transmissive liquid crystal display panel, FIG. 8 is a plan view of one pixel portion of the array substrate in FIG. 7, and FIG. 9 is a cross-sectional view along C-C in FIG. 8. In FIG. 7, the non-display region around the periphery of the display region is depicted in an exaggerated manner for the sake of comprehension of the invention. Also, as used herein the term "display region" refers to the planar region where the pixel electrode is formed and where the alignment of the liquid crystal layer (the liquid crystal molecules) is controlled via the electric field applied to the pixel electrode, while the term "non-display region" refers to the planar region where no pixel electrode is formed and where the alignment of the liquid crystal layer, if present, is not controlled.

A related-art semi-transmissive liquid crystal display panel 10A has an array substrate 11 and a opposed substrate 12 that are opposed to each other and hold a liquid crystal layer between them. On the array substrate 11 there are formed, in the display region 14 on a transparent substrate 13 of glass or the like, parallel and equally-spaced multiple scan lines 17 constituted of aluminum, molybdenum or similar metal. Moreover, the scan lines 17 are coupled, via scan line wiring $17_1$, to a driver circuit placement portion 16 that is provided in the frame region 15 at the periphery of the display region 14.

Further, auxiliary capacitance line 18 is formed roughly centrally between adjacent scan lines 17 so as to be parallel to the scan lines 17, and in addition, a gate electrode G for TFTs is drawn out from the scan lines 17. Further, common wiring is provided on the transparent substrate 13, but is omitted from the drawings.

Also, a gate insulator 19 constituted of silicon nitride, silicon oxide or the like is laid over the entire surface of the transparent substrate 13 so as to cover the scan lines 17, auxiliary capacitance line 18 and gate electrode G, and a semiconductor layer 20 constituted of amorphous silicon, polycrystalline silicon or the like is laid over the gate electrode G, with the gate insulator 19 interposed. Further, a plurality of signal lines 21 constituted of a metal such as aluminum or molybdenum are formed over the gate insulator 19 so as to be orthogonal to the scan lines 17, and the plurality of signal lines 21 are likewise connected, via signal line wiring $21_1$, to the driver circuit placement portion 16. Also, a source electrode S for TFTs is drawn out from these signal lines 21 so as to contact with the semiconductor layer 20, and furthermore, a drain electrode D of the same material as the signal lines 21 and source electrode S are provided on the gate insulator 19, likewise so as to contact with the semiconductor layer 20.

Each region enclosed by the two adjacent scan lines 17 and two adjacent signal lines 21 is equivalent to 1 pixel. TFTs that serve as switching elements are constituted by the gate electrode G, gate insulator 19, semiconductor layer 20, source electrode S and drain electrode D, one TFT being formed for each pixel. The auxiliary capacitance of each pixel is formed by the drain electrode D and auxiliary capacitance line 18.

A protective insulator (also termed passivation film) 22 of for example an inorganic insulating material is deposited over the whole surface of the transparent substrate 13 so as to cover the signal lines 21, TFTs and gate insulator 19. Over this protective insulator 22, an interlayer (also termed a flattening film) 23 constituted of organic insulator is deposited so as to extend over the entire transparent substrate 13. A contact hole 24 is formed in the protective insulator 22 and the interlayer 23 in position corresponding to the drain electrode D of the TFTs. Further, in each pixel a reflector 27 partially constituted of aluminum or similar metal is formed in the TFT and auxiliary capacitance line 18 side, and a pixel electrode 26 constituted of for example ITO (indium tin oxide) or IZO (indium zinc oxide) is formed on the surfaces of the reflector 27, contact hole 24 and interlayer 23. An alignment layer (not shown) is deposited over the surface of the pixel electrode 26 in such a manner as to cover all of the pixels.

The opposed substrate 12 is another transparent substrate 28 constituted of glass plate or the like, for example, on the surface of which a color filter layer 29 composed of red (R), green (G) and blue (B), corresponding to individual pixels, is provided at least in a position corresponding to the display region 14 of the array substrate 11. A top coat layer 30 is deposited on the surface of this color filter layer 29 in at least the position corresponding to the region where the reflector 27 is provided, in other words to the reflective part, of the array substrate 11, and furthermore, a common electrode 31 and an alignment layer (not shown) are deposited on the surface of the top coat layer 30 and color filter layer 29. The top coat layer 30 is provided in order to cause the distance (the cell gap) between the pixel electrode 26 and the common electrode 31 at the reflective part to be approximately ½ the cell gap at the transmissive part where no reflector 27 is provided, and in order that the color tone at the reflective part and at the transmissive part will be equivalent. The color filter layer 29 may, where appropriate, be used in combination with a color filter layer of cyan (C), magenta (M) and yellow (Y), etc., while in the case of a monochrome display, it may be that no color filter layer is provided.

The semi-transmissive liquid crystal display panel 10A is then obtained by: positioning opposite each other the array substrate 11 and opposed substrate 12 obtained in the foregoing manner; deploying, at appropriate intervals around the edge portions, columnar spacers 39 for maintaining a constant cell gap; sealing with sealing agent 35 the peripheries of the array substrate 11 and opposed substrate 12; electrically coupling the common wiring of the array substrate 11 and the common electrode of the opposed substrate 12 via a transfer electrode (not shown); injecting liquid crystal into the space between the two substrates through a liquid crystal injection hole (not shown); and sealing the liquid crystal injection hole.

In such semi-transmissive liquid crystal display panel 10A, a backlight (not shown) is deployed on the array substrate 11 side; in dark places the backlight is lighted and the requisite images are displayed by means of light transmitted through the semi-transmissive liquid crystal display panel 10A, while in bright places the requisite images are displayed by utilizing reflected external light, without lighting the backlight. But if the reflector is provided over the entire rear surface of each pixel electrode 26, a reflective liquid crystal display panel will be obtained. In such a semi-transmissive liquid crystal display panel or reflective liquid crystal display panel, the reflector 27 is in some cases provided on the surface of the pixel electrode 26, and it is common practice, for the sake of achieving good reflection efficiency at the reflective part and also of producing satisfactory white displays, to provide concavoconvexities on the surface of the interlayer 23 at the places where the reflector is provided, with the purpose of making the reflected light into diffuse reflected light.

In a related-art semi-transmissive liquid crystal display panel or reflective liquid crystal display panel such as described above, the non-display region around the periphery of the display region is covered over by a light-blocking black matrix and an outer cover, so that essentially the display region alone will be visible to viewers. For example, in the related-art semi-transmissive liquid crystal display panel 10A shown in FIG. 7, the non-display region 33 has at least the hatched portions covered over by a black matrix and the outer cover, so that the display portion 14 alone is visible to the viewer.

In recent years however, there have come into use liquid crystal display panels in which, in order to improve the appearance, a reflective part that reflects external light is formed in the non-display region around the periphery of the display region, and such non-display region with reflective part formed therein is used for ornament. In a semi-transmissive liquid crystal display panel 10B that uses for ornament such non-display region with reflective part formed therein, the non-display area 33 is covered by the black matrix and outer cover and is invisible to the viewer, whereas the portion of the non-display region 34 where the reflective part is formed is visible to the viewer, as shown in FIG. 10. FIG. 10 is a schematic plan view of a semi-transmissive liquid crystal display panel 10B that uses for ornament a non-display region with a reflective part formed therein; here too, the non-display region around the periphery of the display area is depicted in an exaggerated manner. Structural elements in FIG. 10 that are the same as those of semi-transmissive liquid crystal display panel 10A in FIG. 7 are assigned identical reference numerals, and detailed descriptions thereof are omitted.

At this portion of the non-display region 34 where the reflective part is formed, no pixel electrode is provided and therefore the alignment of the liquid crystal molecules does not vary. Hence such portion is seen by the viewer as being the same color as the color filter layer, provided on the opposed substrate 12, corresponding to such portion. Usually, the color filter layer provided for such portion will be of the same kind as that formed in the display region 14, so that such portion will effectively appear white in color. To have such portion of the non-display region 34 where the reflective part is formed appear in a satisfactory white color, it is necessary, as in a reflective or semi-transmissive liquid crystal display panel, to employ almost the same reflective display structure as in the reflective part of the display region. To that end, concavoconvexities are provided on the surface of the interlayer that underlies the reflectors. Below, such ornamental portion of the non-display region 34 where the reflective part is formed is termed the "border region" and is assigned the same reference numeral "34" when described.

JP-A-2003-228049 discloses a reflective or semi-transmissive liquid crystal display panel in which the concavoconvexities provided on the surface of the interlayer at the reflective part of the display region are also provided in the non-display region, with the purpose of lessening display irregularities due to occurrence of unevenness in the cell gap near the boundary between the display region and non-display region. However, no mention is made therein of making part of the non-display region into a border region such as described above.

In a semi-transmissive liquid crystal display panel 10B having a border region 34 such as described above, the border region 34, while undergoing no change in display status, nevertheless is able to exert an aesthetic ornamental effect whereby the periphery of the display region 14 appears white at all times, so that the appearance is greatly enhanced. However, detailed investigation by the present inventors revealed that in a semi-transmissive liquid crystal display panel 10B having a border region 34 such as described above, dark lines appear alongside the scan line wiring $17_1$ in the areas X enclosed by dashed lines on either side of the display region 14 in FIG. 10.

Upon conducting a series of various investigations into the causes of the occurrence of the night vision phenomenon alongside the scan line wiring $17_1$ of the border region in such a liquid crystal display panel having a border region 34, the present inventors discovered that it was due to causes described below. FIG. 11 is a cross-sectional view of the frame region 15 along line D-D in the semi-transmissive liquid crystal display panel 10B of FIG. 10. In this frame region 15, plural scan line wirings $17_1$ and common wirings 40 are formed on the surface of the transparent substrate 13 on the array substrate 11 side, and the scan line wirings $17_1$ and common wirings 40 are covered by a gate insulator 19 and protective insulator 22. Further, in the border region 34 the surface of the protective insulator 22 is covered by an interlayer 23, and columnar spacers 39 for keeping the cell gap constant are deployed at appropriate intervals around the edge portions. Also, the peripheral portions of the array substrate 11 and opposed substrate 12 are sealed with sealing agent 35.

The region on the opposed substrate 12 where the black matrix 36 is provided forms the non-display region 33, and the area between the non-display region 33 and the display region 14 forms the border region 34. The surface of the interlayer 23 of the border region 34 is formed to have concavoconvexities, and on such concavoconvex surface of the interlayer 23 is formed a reflector 37 constituted of for example aluminum metal; furthermore, a transparent electrode 38 constituted of ITO or IZO is formed on the surface thereof, and the surfaces of both the reflector 37 and the transparent electrode 38 are formed to be concavoconvex. For the sake of balance with the process for producing the dummy electrode for static protection in the related art, the reflector 37 and the transparent electrode 38 are, as shown in FIG. 12, deposited with the same pitch as the reflector 37 and pixel electrode 26 of the display region 14, in an isolated condition such that the reflector 37 and the transparent electrode 38 are not electrically coupled to anything and are in a floating state. A black matrix is formed on the opposed substrate 12 in such a manner as to block light at the positions corresponding to the peripheries of each pixel electrode 26 of the display region 14 and of each transparent electrode 38 in the border region 34 of the array substrate 11, but is omitted in FIG. 11. FIG. 12 is an enlarged schematic view of the top left portion of the array substrate in the liquid crystal display panel 10B of FIG. 10.

Thus, it might be supposed that the portions of the border region 34 alongside the scan line wiring $17_1$ ought not to appear dark, because the liquid crystal molecules present between the transparent electrode 38 and the common electrode 31 do not move, since there is no electric potential difference between the transparent electrode 38 and the common electrode 31, as no potential is generated in the transparent electrode 38, which is in a floating state. Yet, since the voltage applied to the scan line wiring $17_1$ is high AC voltage (for example ±15V), the voltage applied between the scan line wiring $17_1$ and the common electrode 31 is divided and voltage is generated in the transparent electrode 38, so that a voltage $V_{LC}$ is applied between the transparent electrode 38 and the common electrode 31, and due to such voltage $V_{LC}$ the alignment of the liquid crystal molecules between the transparent electrode 38 and the common electrode 31 varies, with the result that the phenomenon of dark appearance occurs alongside the scan line wiring $17_1$ in the border region 34. The voltage that is applied to the signal line wiring $21_1$ is far lower than that applied to the scan line wiring $17_1$ and therefore effectively does not exert any influence on the liquid crystal molecules in the border region 34.

The voltage $V_{LC}$ that occurs between the transparent electrode 38 and the common electrode 31 will now be described using FIG. 13. The average thickness L1 of the interlayer 23 between the scan line wiring $17_1$ and the transparent electrode 38 is approximately 1.45 μm, and the permittivity ε of the polyimide normally used for the interlayer 23 is 3.4, so that a capacitor $C_S$ with the interlayer 23 as dielectric body arises between the scan line wiring $17_1$ and the transparent electrode 38. Further, the average distance L2 between the transparent electrode 38 and the common electrode 31 is approximately 2.0 μm, and the permittivity Δε of the liquid crystal layer generally used is approximately 7, so that a capacitor $C_{LC}$ with the liquid crystal layer as dielectric body arises between the transparent electrode 38 and the common electrode 31.

This means that the voltage $V_0$ that is applied between the scan line wiring $17_1$ and the common electrode 31 is divided by the series circuits of the capacitor $C_S$ that arises between the scan line wiring $17_1$ and the transparent electrode 38, and of the capacitor $C_{LC}$ that arises between the transparent electrode 38 and the common electrode 31, so that the voltage $V_{LC}$ expressed by equation (1) below is applied between the transparent electrode 3 and the common electrode 31. As an example, where the voltage $V_0$ applied between the scan line wiring $17_1$ and the common electrode 31 is 15V, $V_{LC}$ will be approximately 6 V.

Equation 1

$$V_{LC} = \frac{C_S}{C_S + C_{LC}} V_o \quad (1)$$
$$\approx 6[V]$$

The inventors arrived at the present invention upon discovering, as a result of various investigations aimed at resolving the night vision phenomenon alongside the scan line wiring $17_1$ of the border region 34 due to the foregoing causes, that if the transparent electrode 38 and common electrode 31 are electrically coupled and made to have equal potential, the potential difference $V_0$ between the transparent electrode 38 and common electrode 31 can be reduced to 0 V, and thereby the night vision phenomenon alongside the scan line wiring $17_1$ of the boarder region 34 can be eliminated.

SUMMARY

An advantage of some aspects of the invention is to provide a liquid crystal display panel having a border region around the periphery of the display region, in which night vision phenomena will not occur in such border region.

According to an aspect of the invention, a liquid crystal display panel includes: an array substrate that has a display region in which a plurality of signal lines and scan lines deployed as matrices, plus signal line wiring and scan line wiring connected to the signal lines and scan lines respectively, plus common wiring, are provided on a transparent substrate, an insulator is coated over the surface of these, and a pixel electrode is formed in each of the regions on the insulator that are enclosed by the plurality of signal lines and scan lines; a opposed substrate that has a common electrode; a liquid crystal layer that is sealed between the array substrate and the opposed substrate by means of sealing agent that seals together the peripheries of the two substrates; and a transfer electrode that electrically couples the common wire provided on the outer periphery of the sealing agent and the common electrode. It also includes an ornamental reflective part including a reflector and continuously formed transparent electrode being deployed around the periphery of the array substrate's display region, the outer edges of the ornamental reflective part being sealed by the sealing agent. The transparent electrode is electrically coupled to the transfer electrode.

In the above liquid crystal display panel, the transfer electrode may be deployed on the inside of the liquid crystal injection hole that is provided in the sealing agent.

The transfer electrode may be provided so as to contact with the end edge of the inner side of at least one of the sealing agent portions positioned on both sides of the liquid crystal injection hole that is provided in the sealing agent.

Also, in the above liquid crystal display panel, the transfer electrode may be deployed on the outside of the liquid crystal injection hole that is provided in the sealing agent.

Also, in the above liquid crystal display panel, the transfer electrode may be provided so as to contact with the end edge of the outer side of at least one of the sealing agent portions positioned on both sides of the liquid crystal injection hole that is provided in the sealing agent.

Further, in the above liquid crystal display panel, the reflector of the ornamental reflective part may have a concavoconvex structure.

Moreover, a reflector with a concavoconvex structure may be formed on part or whole of the front surface or rear surface of the pixel electrode.

Thanks to the foregoing structure, the invention yields excellent advantages of the kind that will now be described. Specifically, according to a liquid crystal display panel of an aspect of the invention, the transparent electrode formed around the periphery of the array substrate's display region continuously cover the periphery of the display region, and since at least the transparent electrode is electrically coupled to the common electrode via the transfer electrode, the transparent electrode and common electrode have effectively the same electrical potential. Hence, no potential difference will occur between the transparent electrode and common electrode, which means that the liquid crystal molecules present between the transparent electrode and common electrode will not be affected by the signal voltage applied to the scan line wiring, and therefore there will be no appearance of dark lines alongside the scan line wiring and the like phenomena such as occur in the related art. Thus a liquid crystal display panel will be obtained that has an ornamental reflective part—in other words a border region—that gives an attractive, white appearance by utilizing external light reflected by the reflector.

Also, in the related-art liquid crystal display panels the common electrode and common wiring are coupled by means of a transfer electrode, whereas with liquid crystal display panels according to the invention it is possible to utilize the transfer electrode to electrically coupled the transparent electrode of the ornamental reflective part and the common electrode, which means that liquid crystal display panels having a border region that yields a fine ornamental effect can be obtained with ease, without increasing the processing time and labor, and without adding special wiring.

Also, in the above liquid crystal display panel, according to the invention, the transfer electrode may be placed in the interior of the liquid crystal injection hole provided in the sealing agent, which will mean that space for placing the transfer electrode can be assured even in liquid crystal display panels with narrow rims or of the type in which the wiring is drawn around the exterior of the sealing agent, so that a liquid crystal display panel can be obtained which yields the above advantages even where space for placement of the transfer electrode is limited.

Also, in the above liquid crystal display panel, the transfer electrode may be provided so as to contact with the end edge of the inner side of at least one of the sealing agent portions positioned on both sides of the liquid crystal injection hole that is provided in the sealing agent, so that the liquid crystal injection hole will be widened in visual terms, and therefore the work of injecting the liquid crystal can be performed smoothly.

Also, in the above liquid crystal display panel, the transfer electrode may be placed on the outside of the liquid crystal injection hole provided in the sealing agent, which will mean that a wide aperture span can be assured for the liquid crystal injection hole, so that a liquid crystal display panel can be obtained in which the above advantages are yielded, while at the same time the transfer electrode will not be a hindrance to injection of the liquid crystal, and therefore the work of injecting the liquid crystal can be performed smoothly.

Also, in the above liquid crystal display panel, the transfer electrode may be provided so as to contact with the end edge of the outer side of at least one of the sealing agent portions positioned on both sides of the liquid crystal injection hole that is provided in the sealing agent, so that a liquid crystal display panel can be obtained in which the space required for placement of the transfer electrode is rendered small, while at the same time the above advantages are yielded.

Also, in the above liquid crystal display panel, the reflector of the ornamental reflective part may have a concavoconvex structure, which will mean that light incidenting from the exterior will be turned into diffuse reflected light, and at least the ornamental reflective part will appear pure white in color, so that a liquid crystal display panel is obtained that yields an ornamental effect with a fine white appearance.

Also, in the above liquid crystal display panel, it is possible, not only for the transmissive type of liquid crystal display panel but also for the semi-transmissive or the reflective type, to obtain a liquid crystal display panel that yields an ornamental effect with a fine white appearance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will now be described with reference to the accompanying drawings. It should be borne in mind however that the following embodiments are merely illustrative examples of semi-transmissive liquid crystal display panels that realize the technical concepts of the invention. The embodiments are not intended to limit the invention to these particular semi-transmissive liquid crystal display panels. The invention can equally well be adapted to transmissive or reflective liquid crystal display panels and other embodiments contained within the scope of the claims.

First Embodiment

Figure 1:
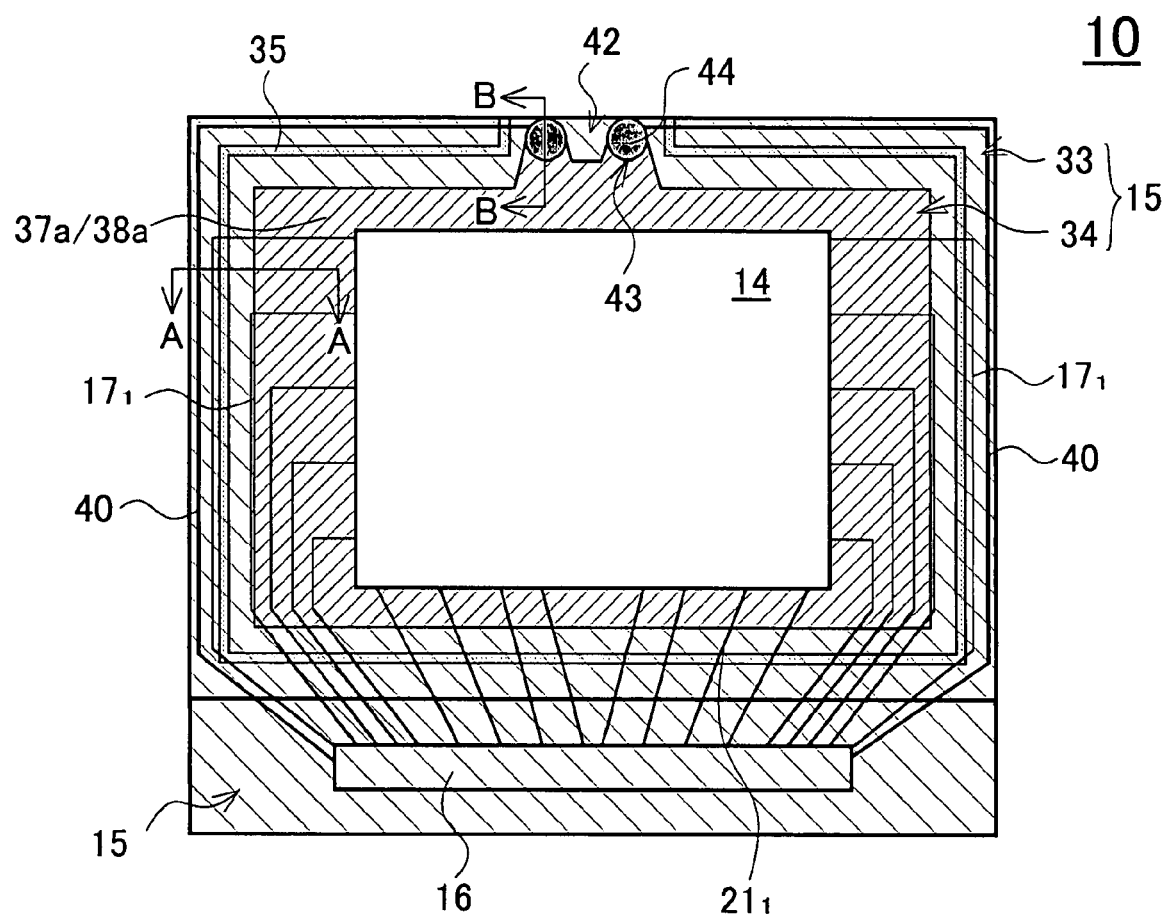
FIG. 1 is a schematic plan view of a single-terminal type semi-transmissive liquid crystal display panel according to a first embodiment.
Figure 2:
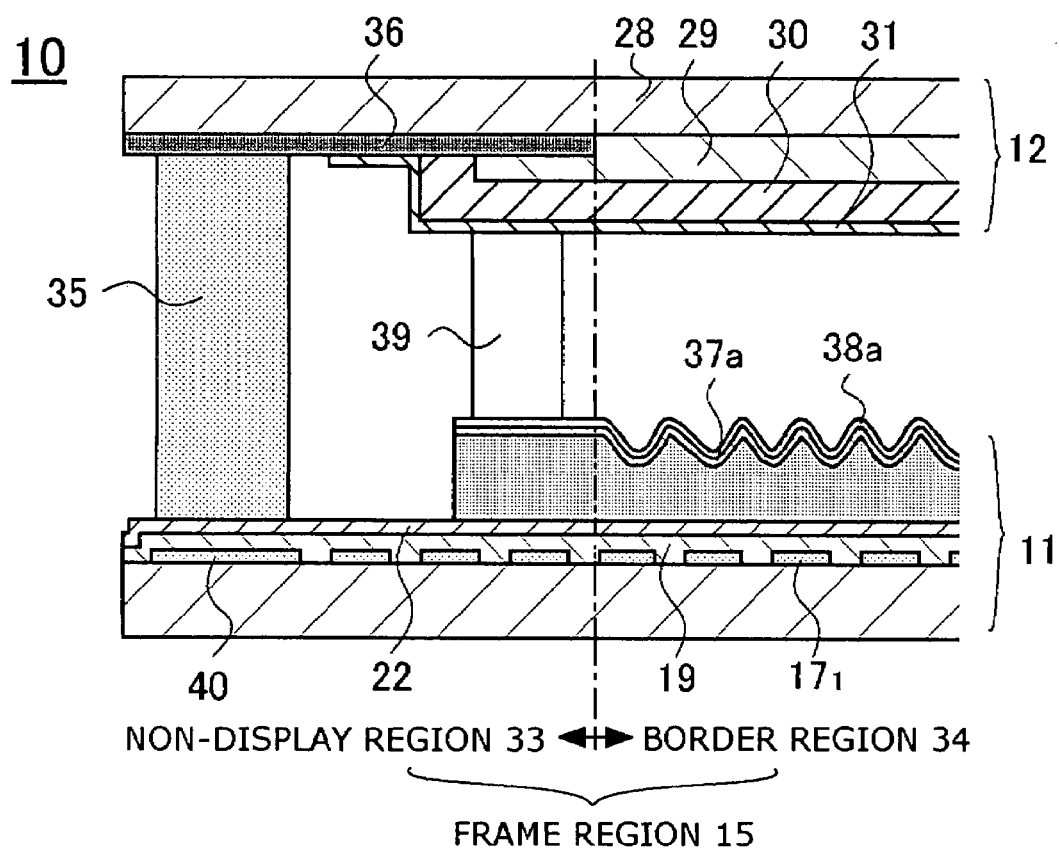
FIG. 2 is a cross-sectional view along line A-A in FIG. 1.
Figure 3:
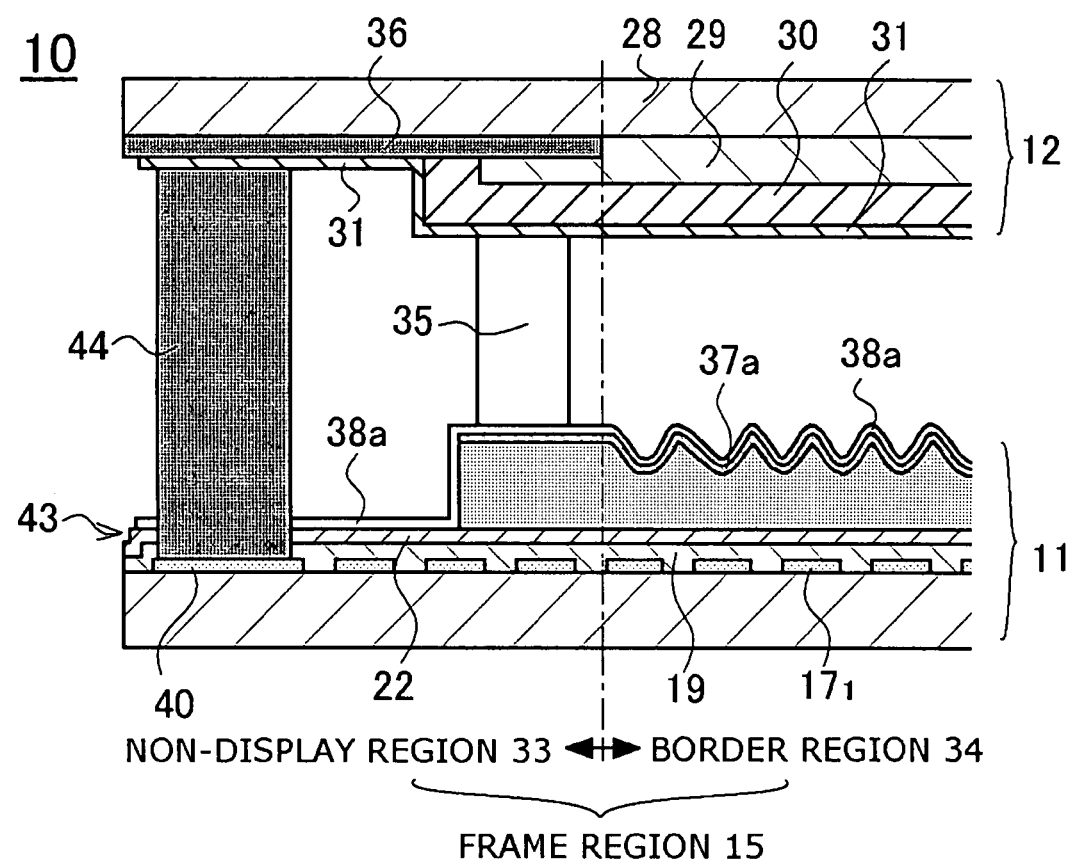
FIG. 3 is a cross-sectional view along line B-B in FIG. 1.
Figure 4:
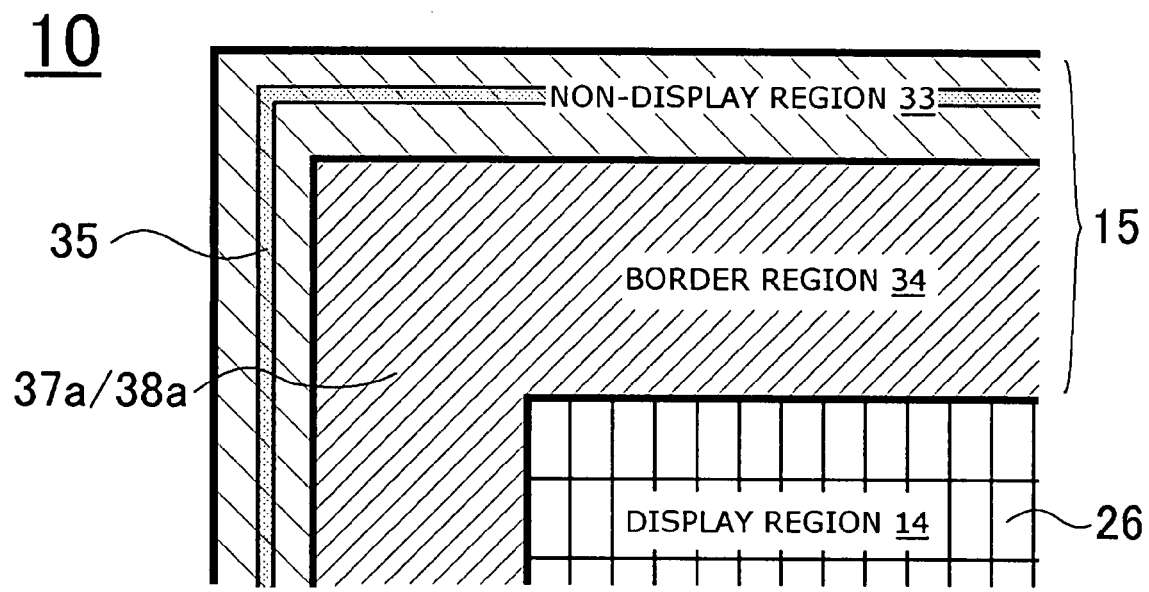
FIG. 4 is a schematic enlarged view of the top left portion of the array substrate in the liquid crystal display panel of FIG. 1.
Figure 8:
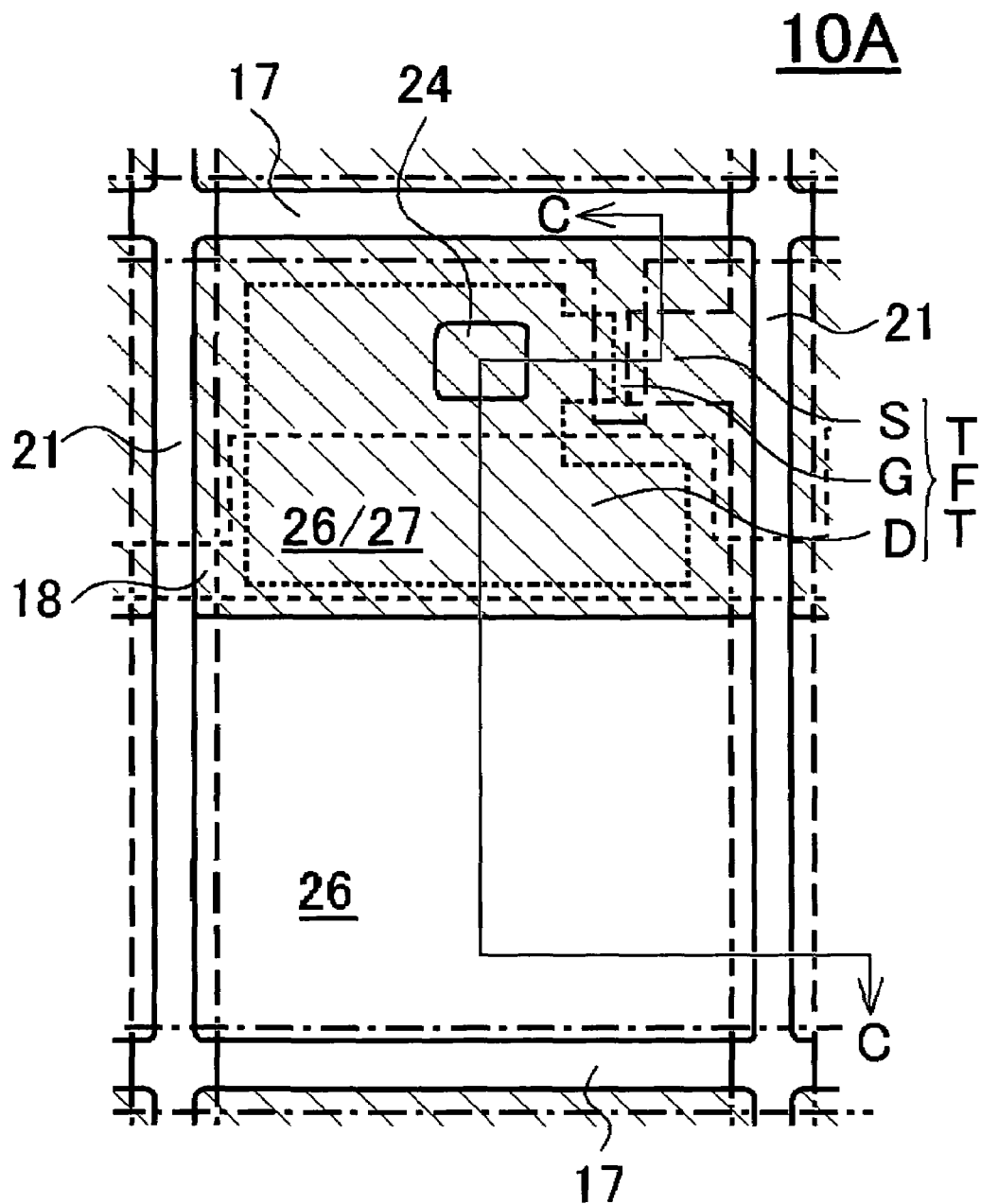
FIG. 8 is a plan view of one pixel portion of the array substrate in FIG. 7.
Figure 9:
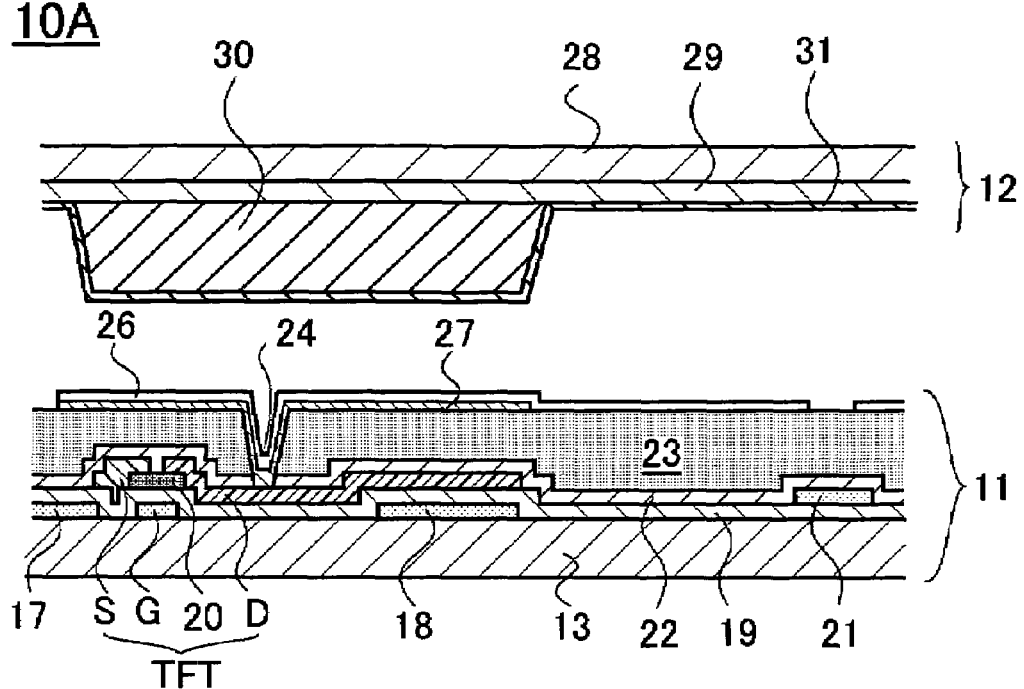
FIG. 9 is a cross-sectional view along line C-C in FIG. 8.
Figure 10:
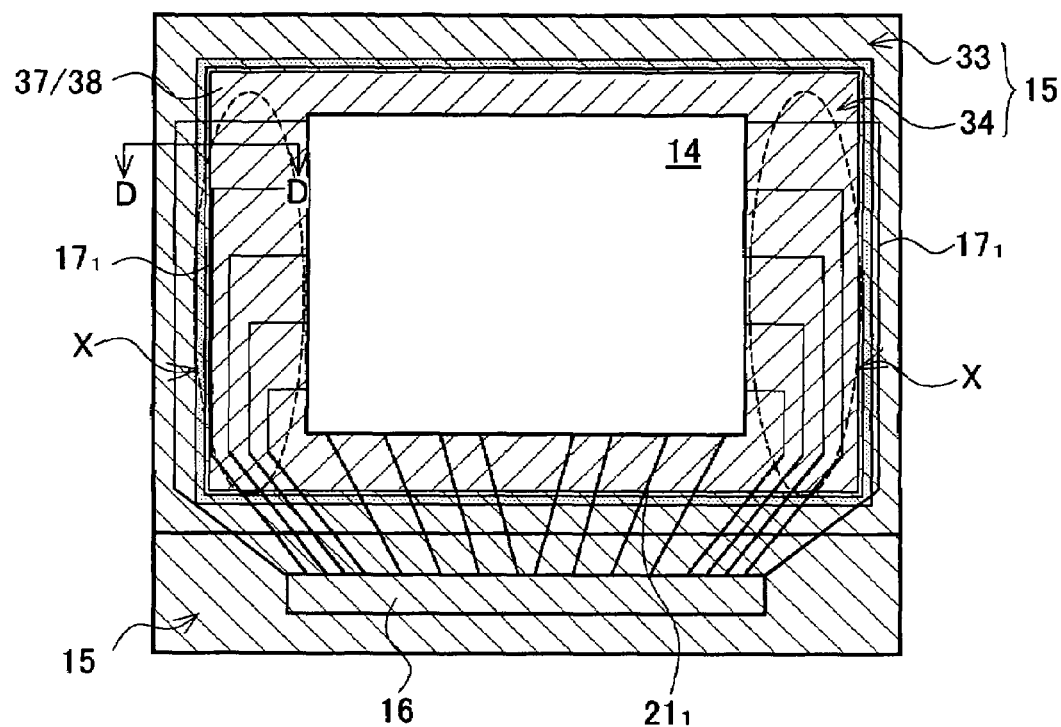
FIG. 10 is a schematic plan view of a liquid crystal display panel that uses for ornament a non-display region with a reflective part formed therein.
Figure 11:
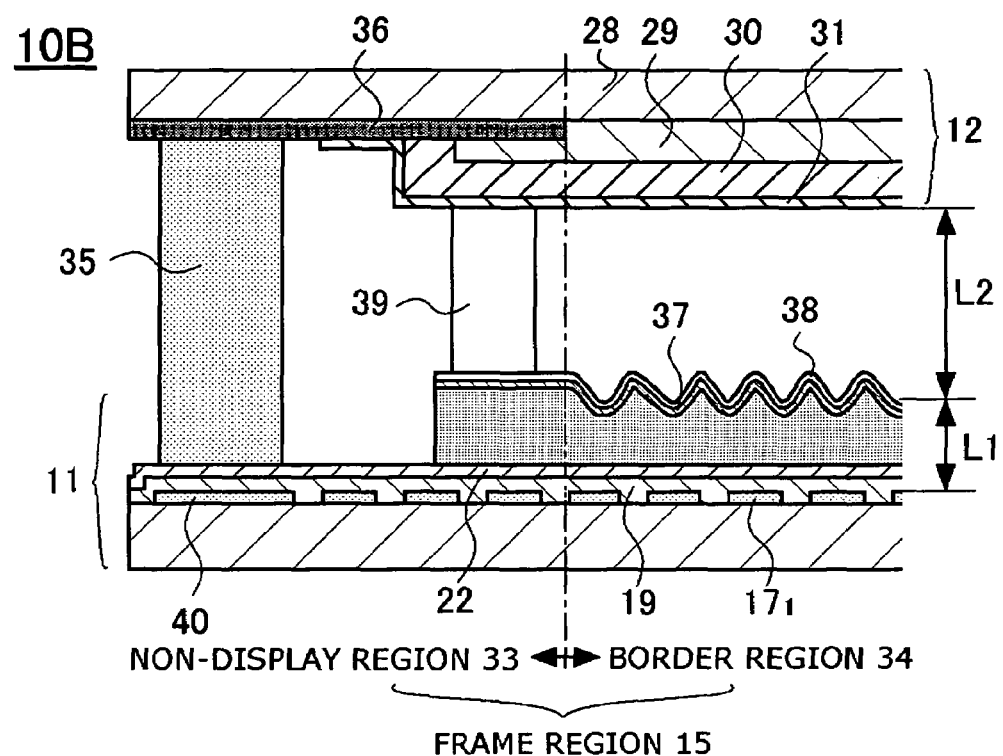
FIG. 11 is a cross-sectional view along line D-D in FIG. 10.
Figure 12:
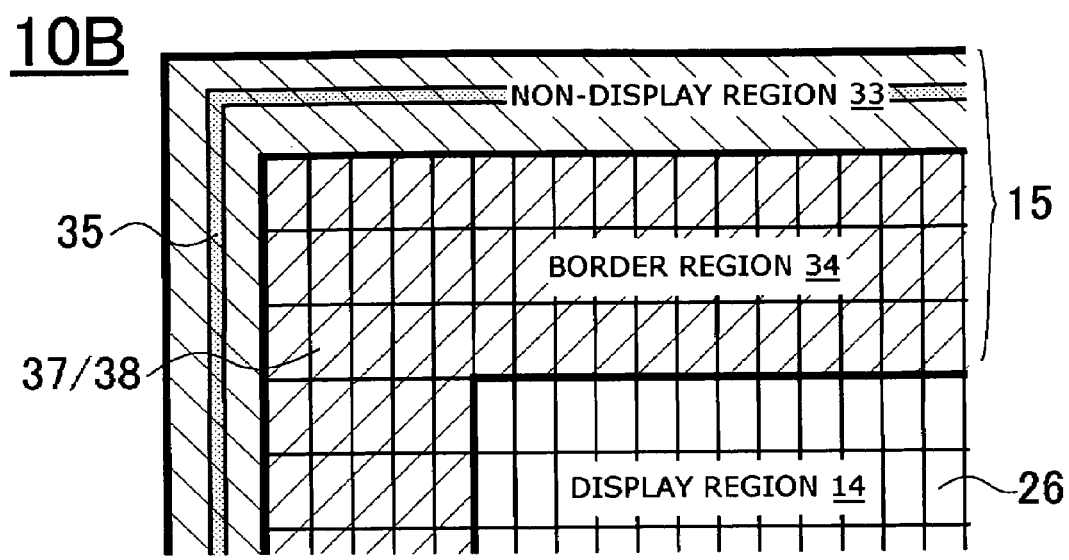
FIG. 12 is an enlarged schematic view of the top left portion of the array substrate in the liquid crystal display panel of FIG. 10.
Figure 13:
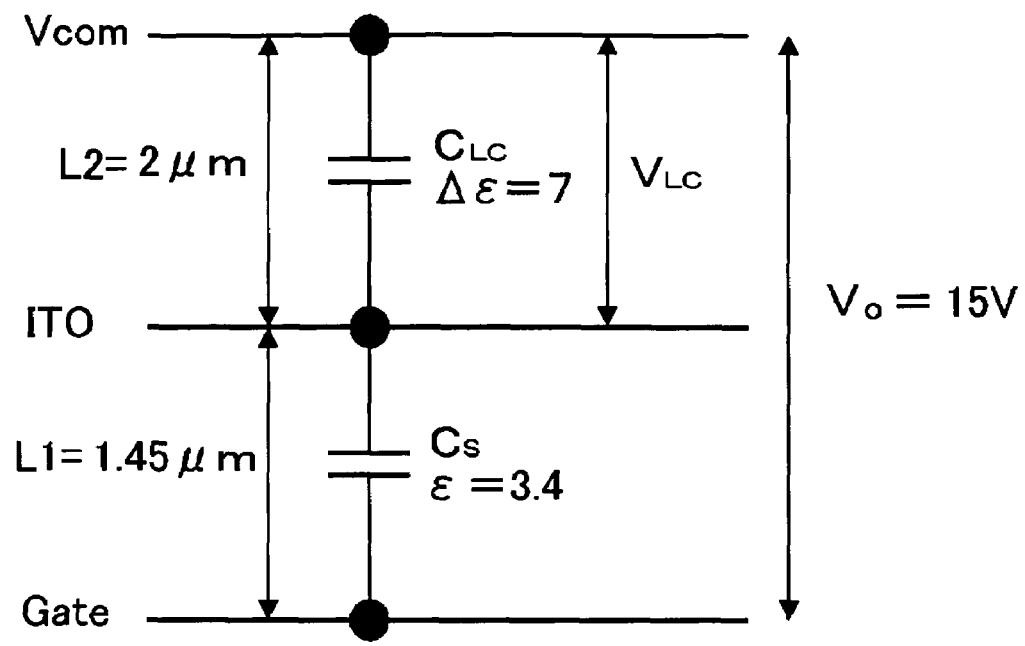
FIG. 13 is an equivalent circuit diagram explicating the voltage $V_{LC}$ that occurs between the transparent electrode and the common electrode.

A semi-transmissive liquid crystal display panel 10 of a First Embodiment is described below using FIGS. 1 to 4. FIG. 1 is a schematic plan view of a single-terminal type semi-transmissive liquid crystal display panel according to the First Embodiment, FIG. 2 is a cross-sectional view along line A-A in FIG. 1, FIG. 3 is a cross-sectional view along line B-B in FIG. 1, and FIG. 4 is a schematic enlarged view of the top left portion of the array substrate in the semi-transmissive liquid crystal display panel of FIG. 1. Since the configuration of the pixels in the display region of the array substrate in the semi-transmissive liquid crystal display panel 10 of the first embodiment is substantially the same as that of the related art items shown in FIGS. 8 and 9, component elements that are identical to those in the related art cases are assigned the identical reference numerals, and where necessary are described with the aid of FIGS. 8 and 9.

The semi-transmissive liquid crystal display panel 10 of the first embodiment has an array substrate 11 and an opposed substrate 12 that are opposed to each other and hold a liquid crystal layer between them. The array substrate 11 has a transparent substrate 13 on which are formed, equally spaced and in parallel, a plurality of scan lines 17 in the display region 14. The plurality of scan lines 17 are coupled via scan line wiring $17_1$ to a driver circuit placement portion 16 that is provided in the frame region 15 at the periphery of the display region 14. Further, auxiliary capacitance line 18 is formed in roughly central positions between adjacent scan lines 17 so as to be parallel to the scan lines 17, and moreover a gate electrode G for TFTs are drawn out from the scan lines 17. In addition, common wiring 40 is provided on the transparent substrate 13.

Also, a gate insulator 19 is deposited over the entire surface of the transparent substrate 13 so as to cover the scan lines 17, auxiliary capacitance line 18 and gate electrode G, a semiconductor layer 20 is formed over the gate electrode G with the gate insulator 19 interposed, a plurality of signal lines 21 are formed on the gate insulator 19 so as to be orthogonal to the scan lines 17, and the plurality of signal lines 21 are likewise coupled to the driver circuit placement portion 16 via signal line wiring $21_1$. Moreover, a source electrode S for TFTs are drawn out from the signal lines 21 so as to contact with the semiconductor layer 20, and in addition, a drain electrode D is provided on the gate insulator 19 so as likewise to contact with the semiconductor layer 20.

Each region enclosed by the scan lines 17 and signal lines 21 is equivalent to 1 pixel, and in each pixel there is formed a TFT. A protective insulator 22 is deposited over the entire surface of the transparent substrate 13 so as to cover the signal lines 21, TFTs and gate insulator 19, and on the protective insulator 22 is deposited an interlayer 23 extending over the whole of the transparent substrate 13. Also, contact hole 24 are formed in the protective insulator 22 and interlayer 23 in positions corresponding to the TFTs' drain electrode D. Further, in each pixel there are formed a TFT plus, along part of the auxiliary capacitance line 18, a reflector 27 constituted of for example aluminum metal, and on the surfaces of the reflector 27, contact hole 24 and interlayer 23, a pixel electrode 26 constituted of for example ITO or IZO is formed. An alignment layer (not shown) is deposited over the surface of the pixel electrode 26 so as to cover all the pixels. In the example described here the interlayer 23 is deposited over the entire surface of the transparent substrate 13, but alternatively the interlayer might not be formed, in which case the contact hole 24 would be formed in the protective insulator 22, and the reflector 27 and pixel electrode 26 would be formed thereon.

The periphery of the display region 14 constitutes the frame region 15. In the frame region 15, the periphery of the surface of the interlayer 23 that is adjacent to the display region 14 is formed with concavoconvexities, but part of such periphery is formed with a flat surface. On the portions of the interlayer 23's surface that are formed with concavoconvexities, a reflector 37a and a transparent electrode 38a are formed continuously in an integrated manner. Thus, as shown in FIGS. 1 and 4, the frame region 15 of the array substrate 11 in the first embodiment has, viewed from above, a border region 34 that is formed around the periphery of the display region 14 and covered continuously with the reflector 37a and the transparent electrode 38a; furthermore, at the periphery thereof there is a non-display region 33. Also, as shown in FIGS. 1 and 3, at least some of the transparent electrode 38a is extended onto the flat portion of the interlayer 23's surface in the non-display region 33, and are electrically coupled to a transfer electrode formation portion 43 that is provided, in isolation, practically at the center of the interior of the liquid crystal injection hole 42 formed in the sealing agent 33. The example here illustrates the case where two transfer electrode formation portions 43 are provided, but alternatively a single transfer electrode formation portion 43 would suffice.

The opposed substrate 12 is constituted of another transparent substrate 28, on which a black matrix 36 is formed in a position corresponding to the non-display region 33 of the array substrate 11. Besides that, a black matrix is also provided so as to shade at least the periphery of the pixel electrode 26 in the display region 14 of the array substrate 11, but is omitted from FIGS. 2 and 3. In the transmissive liquid crystal display panel 10 of the first embodiment, there is no actual need to provide a black matrix in a position corresponding to the border region 34, but to avoid any need to change the manufacturing method used in the related art, such black matrix (not shown) for the border region 34 is nonetheless provided. Further, a color filter layer 29 is provided in positions corresponding to at least the display region 14 and border region 34 of the array substrate 11, so as to correspond to the individual pixels. In at least the position on the surface of the color filter layer 29 of the display region 14 that correspond to the reflective part, a top coat layer 30 is deposited that is for causing the reflective part's cell gap to be roughly 1/2 the transmissive part's cell gap, so that the color tone at the reflective part and at the transmissive part will be equivalent. Further, a common electrode 31 and an alignment layer (not shown) are deposited over the surface of the top coat layer 30 and color filter layer 29.

Finally, the array substrate 11 and opposed substrate 12 thus obtained are positioned opposite each other, a rib (not shown) for maintaining the cell gap at a constant value is deployed appropriately therebetween, the periphery is sealed with sealing agent 35, the transfer electrode 44 is formed in the transfer electrode formation portion 43 provided inside the liquid crystal injection hole 42 formed in the sealing agent 35, thereby electrically coupling the common wiring of the array substrate 11 with the common electrode 31 of the opposed substrate 12, and liquid crystal is injected into the space between the two substrates through the liquid crystal injection hole 42, after which the liquid crystal injection hole 42 is sealed, whereupon the semi-transmissive liquid crystal display panel 10 of the first embodiment is complete.

Thus, in the semi-transmissive liquid crystal display panel 10 of the first embodiment the transparent electrode 38a provided so as to extend continuously over the border region 34 is electrically coupled to the common electrode 31, which is coupled to the common wiring 40 via the transfer electrode. 44. This means that the transparent electrode 38a and the opposed electrode 31 have equal potential, so that the liquid crystal molecules present between the transparent electrode 38a and the common electrode 31 will not be affected by the potential of the scan line wires $17_1$ provided below the interlayer 23, and therefore phenomena such as the border region 34 appearing dark alongside the scan line wiring $17_1$, as in the related art, will not occur. Thus there is obtained a liquid crystal display panel 10 having a border region 34 yielding an ornamental effect with fine white appearance.

Also, according to the semi-transmissive liquid crystal display panel 10 of the first embodiment, the transfer electrode 44 is utilized not only to electrically couple the transparent electrode 38a and the common electrode 31, but also to electrically couple these to the common wiring 40. Since the transfer electrode 44 is an item customarily used in related-art liquid crystal display panels, this means that the transparent electrode 38a can be electrically coupled to the common electrode 31 and the common wiring 40 in a simple manner—in particular, without increasing the processing time and labor, and without adding any special wiring. Moreover, since the transfer electrode 44 is deployed inside the liquid crystal injection hole 42 provided in the sealing agent 35, space for placing the transfer electrode 44 can be assured even in liquid crystal display panels with narrow rims or of the type in which the wiring is drawn around the exterior of the seal portion.

Further, according to the semi-transmissive liquid crystal display panel 10 of the first embodiment, the position on the periphery of the opposed substrate that correspond to the border region 34 is covered by a black matrix 36. This means that although the display region 14 and border region 34 will be clearly visible from the exterior, the outer periphery of the border region 34 will not be visible from the exterior. Thus, the border region 34's outer periphery, which has no ornamental effect, is rendered invisible from the exterior, with the result that a semi-transmissive liquid crystal display panel 10 can be obtained that has a border region 34 that exerts an ornamental effect with good appearance by utilizing the external light reflected by the reflector 37a.

Also, although the example in the first embodiment is a case where the inner surface of the portion of the opposed substrate 12 that correspond to the non-display region 33 is covered with a black matrix 36 to block light, the invention is not limited to this. Light could alternatively be blocked by providing the black matrix on the outer side of the opposed substrate 12, or the outer cover could be used to shade the opposed substrate 12. However, since the black matrix formation process is contained in the formation of the color filter layer 29 of the opposed substrate 12, the black matrix 36 can be formed at the same time as such black matrix formation, and therefore it will be preferable to shade the inner surface of the portion of the opposed substrate 12 that correspond to the non-display region 33 by covering them with the black matrix 36. Moreover, such will preferably be combined with use of the outer cover to shade the outer side of the opposed substrate 12, in the interest of protecting the frame region of the semi-transmissive liquid crystal display panel 10.

Although the example in the first embodiment is a case where the surface of the interlayer 23 of the border region 34 is concavoconvex, such concavoconvexities could alternatively be render and the surface rendered flat. In that case however, the surface would act as a mirror, so that although a certain ornamental effect would be obtained, the boundary between the display region 14 and the border region 34 would be visually salient. Therefore, except when a special effect is intended, a better appearance will be obtained by providing the concavoconvexities, which will yield a white color.

Second Embodiment

Figure 5:
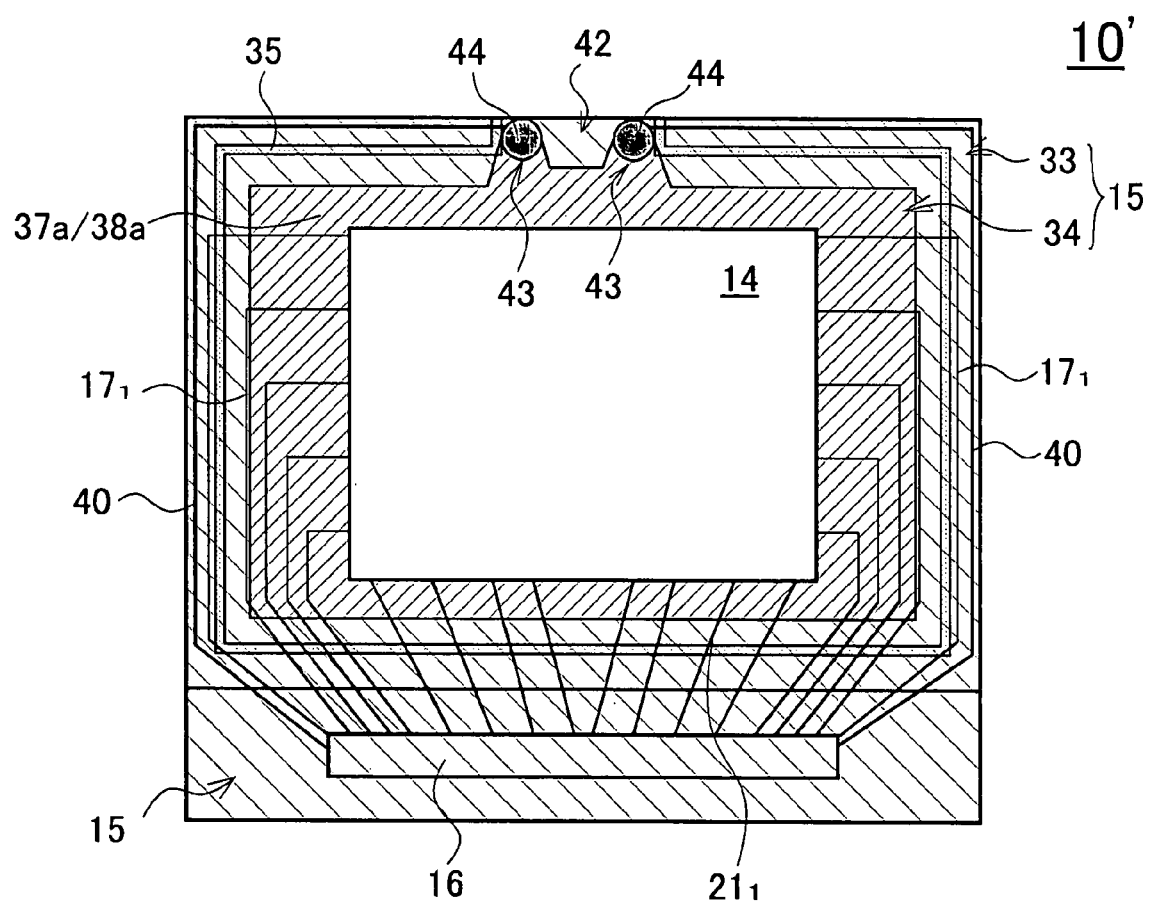
FIG. 5 is a schematic plan view of a single-terminal type semi-transmissive liquid crystal display panel according to a second embodiment.

The liquid crystal display panel 10 of the first embodiment is an example where the transfer electrode 44 is deployed in the center of the interior of the liquid crystal injection hole 42 formed in the sealing agent 35. With such a structure however, the aperture of the liquid crystal injection hole 42 is obstructed by the transfer electrode 44, and therefore is rendered smaller in visual terms, which could render it difficult to inject the liquid crystal. To ameliorate this, in the liquid crystal display panel 10' of a second embodiment, the transfer electrode 44 is provided so as to contact with the end edge on the inner side of both of the sealing agent 35 portions located on both sides of the liquid crystal injection hole 42. FIG. 5 is a schematic plan view of the single-terminal type semi-transmissive liquid crystal display panel 10' of the second embodiment. The structure of the semi-transmissive liquid crystal display panel 10' of the second embodiment differs from the liquid crystal display panel 10 of the first embodiment only in the placement of the transfer electrode formation portion 43 and transfer electrode 44. Accordingly, structural elements that are the same as those in the liquid crystal display panel 10 of the first embodiment are assigned identical reference numerals, and detailed descriptions thereof are omitted.

According to a liquid crystal display panel 10' of the second embodiment, a liquid crystal injection hole 42 that is larger in visual terms than that in the first embodiment can be assured, even though the aperture span of the liquid crystal injection hole 42 is the same as in the first embodiment, and thus the work of injecting the liquid crystal can be performed smoothly. Besides this advantage concerning injecting of the liquid crystal, the liquid crystal display panel 10' of the second embodiment yields essentially the same advantages as the liquid crystal display panel 10 of the first embodiment. Here too, the example is one where a total of two transfer electrode formation portions 43 and two transfer electrodes 44 are provided, with in each case each one of the two contacting against the both end edge of the inner side of the sealing agent 35 portions located on both side of the liquid crystal injection hole 42; but alternatively a single one of each, would suffice.

Third Embodiment

Figure 6:
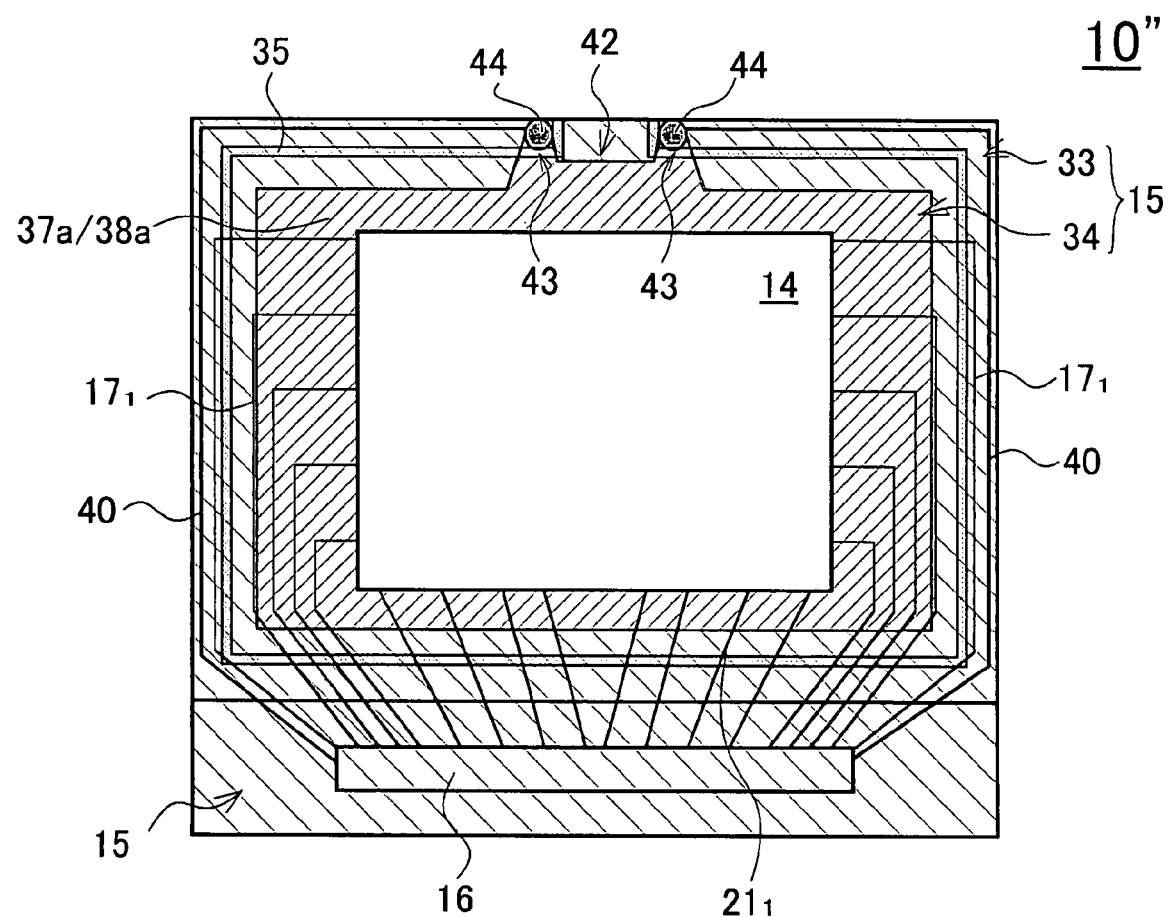
FIG. 6 is a schematic plan view of a single-terminal type semi-transmissive liquid crystal display panel according to a third embodiment.
Figure 7:
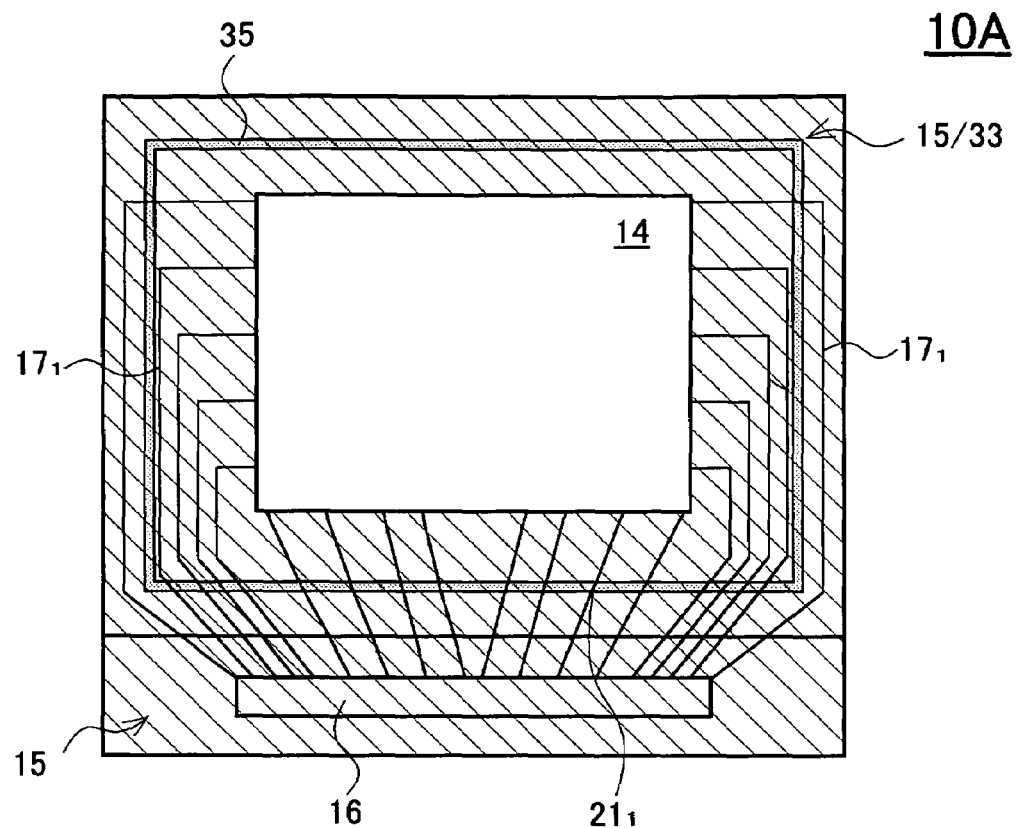
FIG. 7 is a schematic plan view of a related-art single-terminal type semi-transmissive liquid crystal display panel.

The semi-transmissive liquid crystal display panels 10 of the first and second embodiments are both examples where the transfer electrode 44 is deployed inside the liquid crystal injection hole 42 formed in the sealing agent 35. But with such a structure, the aperture of the liquid crystal injection hole 42 is obstructed by the transfer electrode 44, which could render it difficult to inject the liquid crystal. To ameliorate this, in the semi-transmissive liquid crystal display panel 10" of a third embodiment, the transfer electrode 44 is provided so as to contact with the end edge on the outer side of both of the sealing agent 35 portions located one on either side of the liquid crystal injection hole 42. FIG. 6 is a schematic plan view of the single-terminal type semi-transmissive liquid crystal display panel 10" of the third embodiment. The structure of the semi-transmissive liquid crystal display panel 10" of the third embodiment differs from the liquid crystal display panel 10' of the second embodiment only in the placement of the transfer electrode formation portion 43 and transfer electrode 44. Accordingly, structural elements that are the same as those in the liquid crystal display panel 10' of the second According to a liquid crystal display panel 10" of the third embodiment, a wide aperture span can be assured for the liquid crystal injection hole 42, and the transfer electrode 44 will not pose hindrance to injecting of the liquid crystal, which means that the work of injecting the liquid crystal can be performed smoothly. Besides this advantage concerning injecting of the liquid crystal, the liquid crystal display panel 10" of the third embodiment yields essentially the same advantages as the liquid crystal display panel 10 of the first embodiment and the liquid crystal display panel 10' of the second embodiment. Here too, the example is one where a total of two transfer electrode formation portions and two transfer electrodes are provided, with in each case each one of the two contacting against the both end edge of the sealing agent 35 portions located on both side of the liquid crystal injection hole 42; but alternatively a one of each, would suffice. Furthermore, in cases where there is ample space in which to provide the transfer electrode 42, they could be placed on the outer sides of the sealing agent 35 portions located one on both side of the liquid crystal injection hole, but with a certain distance interposed so as not to contact therewith.

What is claimed is:

1. A liquid crystal display panel comprising:
   an array substrate that has a display region in which a plurality of signal lines and scan lines deployed as matrices, plus signal line wiring and scan line wiring connected to the signal lines and the scan lines respectively, plus a common wiring, are provided on a transparent substrate, an insulator is coated over the surface of these, and a pixel electrode is formed in each of the regions on the insulator that are enclosed by the plurality of signal lines and scan lines;
   a opposed substrate that has a common electrode;
   a liquid crystal layer that is sealed between the array substrate and the opposed substrate by means of sealing agent that seals together the peripheries of the two substrates; and
   a transfer electrode that electrically couples the common wire provided on the outer periphery of the sealing agent and the common electrode;
   an ornamental reflective part that has a reflector and a continuously formed transparent electrode being deployed around the periphery of the array substrate's display region;
   the outer edges of the ornamental reflective part being sealed by the sealing agent; and
   the transparent electrode being electrically coupled to the transfer electrode.

2. The liquid crystal display panel according to claim 1, wherein the transfer electrode is deployed on the inside of a liquid crystal injection hole that is provided in the sealing agent.

3. The liquid crystal display panel according to claim 2, wherein the transfer electrode is provided so as to contact with the end edge of the inner side of at least one of the sealing agent portions positioned on both sides of the liquid crystal injection hole that is provided in the sealing agent.

4. The liquid crystal display panel according to claim 1, wherein the transfer electrode is deployed on the outside of the liquid crystal injection hole that is provided in the sealing agent.

5. The liquid crystal display panel according to claim 4, wherein the transfer electrode is provided so as to contact with the end edge of the outer side of at least one of the sealing agent portions positioned on both sides of the liquid crystal injection hole that is provided in the sealing agent.

6. The liquid crystal display panel according to claim 1, wherein the reflector of the ornamental reflective part has a concavoconvex structure.

7. The liquid crystal display panel according to claim 1, wherein the reflector with concavoconvex structure is formed on part or whole of the front surface or rear surface of the pixel electrode.

* * * * *